Patented Sept. 19, 1933

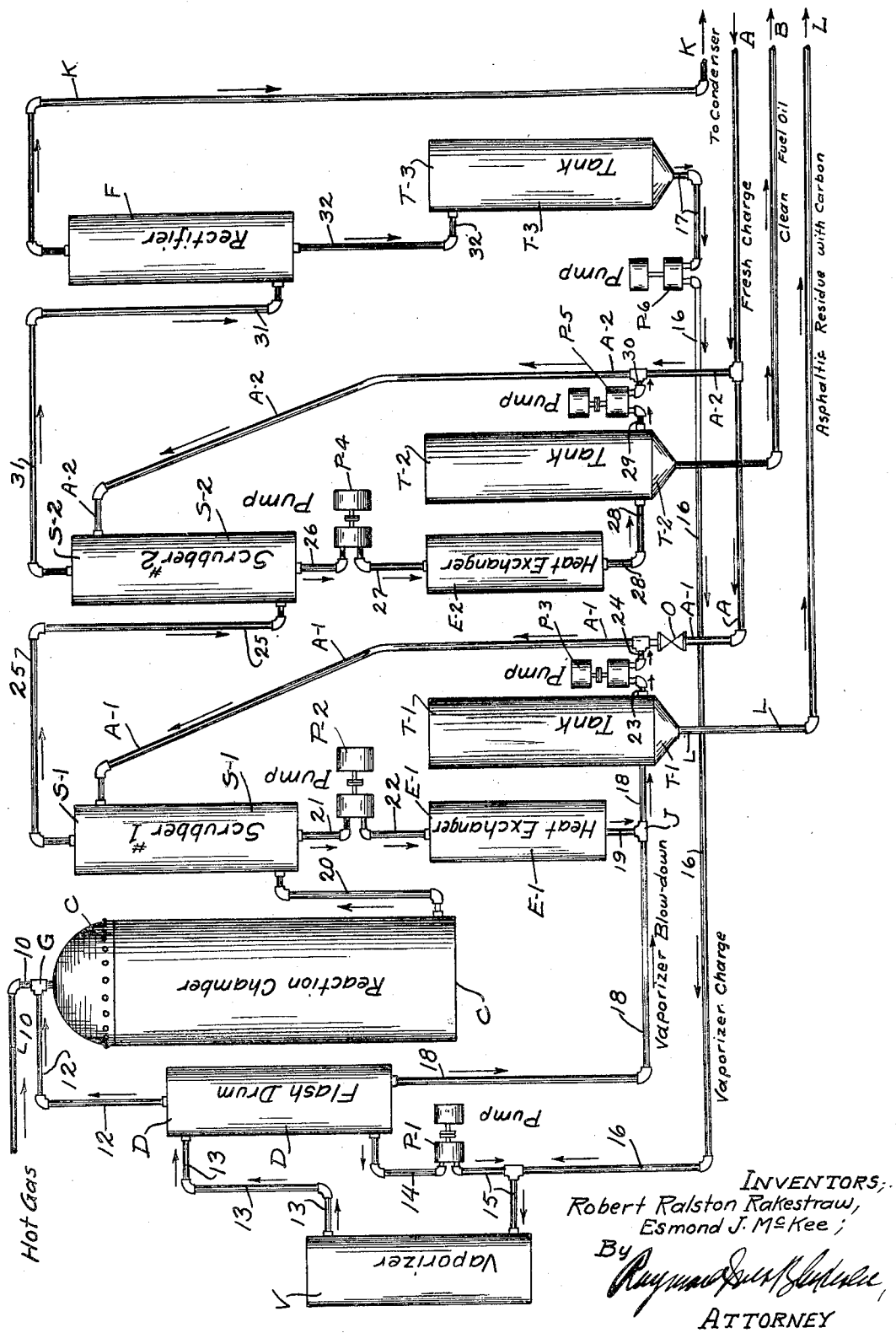

1,927,042

UNITED STATES PATENT OFFICE 1,927,042

APPARATUS FOR TREATING HYDROCARBONS

Esmond J. McKee and Robert Ralston Rakestraw, Los Angeles, Calif., assignors to Western Oil and Refining Company, Los Angeles, Calif., a corporation of Nevada Application May 1, 1929. Serial No. 359,696

1 Claim. (Cl. 196—122)

This invention relates to the treatment of hydrocarbons and more particularly to improvements in the treatment of the products from "cracking" stills or systems, or which have been vaporized by any treatment or system.

Some of the objects of the invention are: to remove the free carbon usually in suspension in the hydrocarbons which come from the cracking stills; to convey the removed carbon to a suitable container with certain accompanying residue and there to produce an asphaltic compound, in which the carbon content is not detrimental; to further treat that carbon-free portion of the hydrocarbon to produce various substances, the comparative quantity of each being subject to change and determined by the market as it may exist, or fluctuate; to accomplish these several purposes simply, cheaply and without complex or costly apparatus; to provide means whereby the operation of the apparatus is continuous; not intermittent. Other objects will appear as the description proceeds.

With these and other objects in view, this invention consists in the new and useful provision, aggroupment, formation, construction, combination and interrelation of parts, members and features, all as hereinafter disclosed, shown in the drawing and finally pointed out in the claim.

As is well-known in the art, vapors, or vapors with some slight admixture of liquid, which proceed from certain heat treatments of hydro-carbon oils, such as "cracking", contain varying amounts of free carbon in suspension, the carbon being necessarily very finely divided and in some cases approaching, or actually in, a colloidal state. It is also well-known that any appreciable quantity of free carbon is objectionable and detrimental in oils used for fuel, and the usual specifications for fuel oil carry a clause limiting the quantity of free carbon in the oil, so that free carbon in fuel oils diminishes their value and if the proportion of carbon exceeds some established limit, the oil is not salable at all, for fuel.

Various attempts have been made to eliminate the free carbon from the oil but, so far as we now know, none has combined the features of reliability, certainty, simplicity, inexpensiveness of apparatus and low cost of operation.

In practicing this invention, the apparatus employed is similar to the usual cracking, cleansing and condensing apparatus, varying only in a few new and original features interposed between those portions where the "cracking" is done and the hot vapors pass to the scrubbers, and the outgoing lines from the scrubbers to the rectifier. As well known, a scrubber is a closed, vertical vessel, or container, lined with refractory material and filled in with a stepped open-work, also of refractory material, which is designed to provide a comparatively large area of surface, yet avoid obstruction of a free flow of gases and vapors therethrough; in other words, a foraminous refractory checker-work. The hot gases and vapors which are admitted to the scrubber flow naturally upward, the entering temperature being usually around 900° F.

While this upward flow of the hot gases and vapors takes place, liquid oil is sprayed into the scrubber from the top downwards, or counter to the flow of the rising vapors and gases. The temperature of the entering oil is, usually, around 400° F., though this is not a limiting condition. This counter flow of liquid oil through the vaporized product, results in (a) the gathering of the carbon particles by the liquid; (b) the vaporization of a portion of the incoming, sprayed oil by the heat of the vapors which added, volatilized oil is commingled with the principal mass of vapor being treated in the scrubber; and (c) a condensation of a small part of the vapors and the mingling of the resultant liquid with the inflowing spray. The various relative quantities of oil and vapors, as well as the temperatures of inflowing and outgoing oil are all controlled and adjusted by varying the pump-speeds of the several pumps used to move and circulate the different substances in the various pipe lines. The vapors pass upward and out of the scrubber at the topmost opening while the liquid flows downward through the lowermost opening of the scrubber to a heat exchanger through which it is pumped. Generally, the temperature of the oil passes from the scrubber at the bottom at about 650° F., and is lowered to around 400° F. in the heat exchanger.

Most of the liquid from the heat exchanger is again circulated through the scrubber, some new oil being added to make up whatever deficiency may proceed from the continuous drawing off of some of the finished stock, plus the vaporizing of some of the lighter constituents of the inflowing liquid. The lighter volatiles pass out through the top opening in the scrubber and are carried off for further treatment such as condensation. The heavier constituents of this liquid accumulate in an appropriate vessel during circulation. This accumulation is drawn off as fuel oil. Obviously, it contains all of the free carbon removed from the scrubber. From which, it is obvious that in usual practice the one, single scrubber is required to fulfill a two-fold purpose, viz, one, the cleaning of the vapors by the abstraction of the carbon, which is its principal function; the other, that of volatilizing a portion of the oil sprayed into the scrubber, thereby producing an additional quantity of vapor which is later condensed into a light oil product. But the free, suspended carbon remains in the residue, which accumulates from the heat exchanger, and is the fuel oil produced in the process. Hence, the fuel oil contains free carbon which, as before pointed out, is objectionable, and makes such product unmarketable, or worth far less than carbon-free fuel oil.

This invention is designed to collect the carbon in a liquid which is separated from the fuel oil, leaving the latter substantially carbon-free.

Briefly, the salient features of the new process include the substitution of two scrubbers in series for the usual single scrubber. The hot vapors pass to the first scrubber and are there treated by an inflowing stream or spray of liquid oil, falling from the upper portion of the scrubber, downwards through the vapors which hold the carbon in suspension, so that the free carbon is thus abstracted from the cracked vapors. A very small quantity of the liquid oil flowing into the scrubber is vaporized, and mixes with the previously cracked vapors, thus adding more vapor to the total quantity received from the treating apparatus. The carbon-laden liquid oil falls to the bottom of the first scrubber and, by means of appropriate pumps is circulated to pass again through the same scrubber, some additional liquid oil being added continuously. This process is continuous, so that the quantity of liquid sprayed into the scrubber is always sufficient to take up substantially all of the suspended free carbon. During this process a heavy, carbon-charged liquid, or residue, accumulates in the bottom of a tank under the scrubber and is drawn off. This accumulated residue is a comparatively small portion of the total quantity of oil passed through this first scrubber. It forms an asphaltic substance which has several industrial uses, none of which require that it be carbon-free.

The apparatus for cracking and the treating devices and processes, up to the scrubbing of the vapors, are well known in the art and they require no description here. Nor would it be appropriate to detail any one of the cracking and treating processes in this application because this invention is equally applicable to any known cracking and treating system now available and probably to others not yet perfected. Hence, it is sufficient to state here that in the present systems and processes, the vapors, and accompanying substances, contain objectionable proportions of free carbon when they reach the scrubber, and this carbon continues with the condensed oils or liquids, and produces fuel oils which are unsatisfactory and not salable at the same price as carbon-free oils, if salable at all.

Referring to the drawing: This is a diagrammatic indication of that portion of the system included between the initial cracking apparatus at entry of hot gas from the stove (not shown), and the rectifier and its tank, or from the vaporizer on the left to the rectifier on the right. No parts are shown other than those portions which lie between the elements named because, in this invention, no change is made from the existing systems in any of the parts excepting the scrubber portion with the accompanying ancillary apparatus.

In the drawing, hot fixed gases flow through pipe 10 to the top opening in the reaction chamber, C. A second pipe, 12, connects the flash drum, D, to the same top opening in the reaction chamber, pipes 10 and 12 joining at any convenient point as G, and thereby providing a common entry into the top of C. A continuous supply of vaporized oils flows into the system through pipe 12, and into C, pipe 12 feeding C with oil vapor, which comes from vaporizer V and flash drum D.

Oil from tank T—3, which receives the rectifier condensate, is carried back to the bottom inlet of V through pipe 17, pump P—6, pipe 16 and pipe 15 as shown. This oil is circulated around through V and D as long as may be required. The path of the material is from V through 13 to D, down through D and out by 14 and 15 to V, then again up through V. Pump P—1 produces the motive force to keep the material in constant circulatory movement. From D, a portion of the material passes to a bottom inlet of tank T—1 through pipe 18. The continuous flow from D to C and to T—1, is compensated by the incoming oil from T—3, delivered by pipe 16.

As will be later seen, the oil from T—3 is not new oil from an outside source, but is a recirculated oil which proceeds from the closed circulating system. The new oil for the system, to be mixed with the continuously incoming hot gas, drawn through pipe 10 to the reaction chamber, C, is brought in through the fresh charge pipe, A, and is delivered by branches A—1 and A—2 to scrubbers S—1 and S—2 respectively, to the upper openings in the scrubbers for spraying down into the ascending hot vapors as already mentioned.

From the reaction chamber C the hot, carbon-laden vapors pass to scrubber S—1, entering it near the bottom and, as explained, they rise upward through the hot refractory checker-work, while the cooler oil, from the incoming fresh charge line, A—1, is admitted near the top and is sprayed downward through the counter-flowing gases, the quantity of oil admitted to S—1 being comparatively small, and just sufficient to gather the free carbon. Since the quantity of oil spray is small, the temperature of the gases is not greatly diminished by its entry and commingling with the vapors, so that the liquid oil will pass out at the bottom of the scrubber at a comparatively high temperature. Therefore, a device for abstracting some of the heat is desirable though not essential. This heat abstracting device is the heat exchanger, E—1. The liquid substances in the scrubber S—1 are drawn out through pipe 21 by pump P—2 to pipe 22 and thence passed through the heat exchanger E—1, which may be of any appropriate type or design. After passing through E—1, the now cooler substances pass through pipes 19 and 18 to tank T—1. These mix with material from the flash drum D, the pipe 18 from the bottom of D to T—1 joining pipe 19 from E—1 at the T J as shown.

Following the pipe lines connecting the different devices, it is seen that a complete circuit exists through S—1, E—1 and T—1, the pipes 21 and 22 connecting the bottom of S—1 to the upper opening in E—1; pipes 19, 18 joining the outlet of E—1 to a lower inlet of T—1, then via 23, P—3 and 24 to A—1 and through A—1 to an upper inlet of S—1. The inlet 18 and outlet 23 of T—1 are well above the residuum draw-off at L.

By means of pumps P—2 and P—3, the liquid, which latter comprises part of the new, inflowing oil coming in through pipe A—1 as well as a slight condensation, is kept in continual circulation until the free carbon, mixed with the heavy asphaltic residue, is collected in the bottom of T—1 and drawn off through pipe L. Of course, the process is continuous, the circulation of the materials proceeding while carbon-laden residue flows from T—1 out through pipe L. That portion of the vaporized oil, comprising the lighter distillates, which rises past the oil spray, uncondensed, passes out from the top of S—1 through pipe 25 to the lower portion of the scrubber S—2 from where it rises and meets the inflowing oil, entering S—2 through pipe A—2, which is sprayed downwards, counter to the flow of the gases and vapors. This tends to cool the vapors slightly and also to vaporize some of the inflowing oil. The resultant liquid portion of the mixture falls to the bottom of S—2, and, just as described in the preceding case, the materials in S—2 pass around a complete circuit made up of 26, P—4, 27, E—2, 28, T—2, 29, P—5, 30, A—2 and back to upper inlet of scrubber S—2. The substances in S—2, which are substantially carbon-free, due to the prior treatment in S—1, are continually circulated while the denser residuals accumulate in the bottom of T—2 and are continuously drawn off by pipe B, forming a carbon-free fuel oil.

The rest of the process and apparatus are identical with the present practice. The more volatile, uncondensed vapors, pass out from S—2 through an upper opening, via pipe 31 to an inlet in the rectifier F near its lower end. The heavier substances pass down from F through its bottom opening, via pipe 32 to the top opening in tank T—3, while the lighter vapors in F rise and pass out through the top opening to pipe K and through it to the condenser (not shown). The condensate collected in T—3 is carried back to V, via 17, P—6, 16 and 15 to lower inlet of V, as before described.

As before indicated, the real invention here lies in the changing of the apparatus and the method of treatment in the stage of oil treatment where the scrubbing is done. Instead of a single scrubber to perform two functions with unsatisfactory results, two scrubbers are supplied through which the vapors are successively passed, each scrubber performing one single function; the first scrubber and appurtenances, abstracting the carbon which does not pass to the second one and the removal of which makes the second scrubber treatment wholly different from the effects encountered in standard practice.

Nor is the treatment in the first scrubber, nor the results obtained, the same as now practiced and obtained in any single scrubber system. The differences are considerable, important and produce valuable new results as has been herein pointed out.

Having described our invention in connection with illustrative embodiments, forms, proportions and arrangement of parts, as well as methods and order of steps in treatment, it will be understood that variants thereof are possible and our invention, in its broader aspect, is not limited to the specific construction or orders of steps herein described and shown, as changes in the sizes, proportions, configurations, arrangements, assemblage, interaction, juxtaposition and mechanical relations, as well as additions, omissions, substitutions, combinations and alterations of forms, parts, members and features, methods of treatment and order of procedure may be made without departing from the broad spirit of this invention.

Having thus disclosed our invention, we claim and desire to secure by Letters Patent:

In apparatus of the character described, a scrubber for the removal of carbonaceous substances from oil vapors supplied to the scrubber, means for the supply of oil vapors to the scrubber, separate independent means for the supply of fresh liquid oil to the scrubber in counter current to the vapors, means for conducting the cleaned vapors from the scrubber, a cooler connected with the scrubber to receive carbon containing liquid therefrom, a collection tank connected in liquid receiving relation to said cooler, the fresh oil supply means being separate from and independent of the collection tank, means for the drawing off of carbon laden liquid from said tank, and a connection including a pump between said tank and said fresh oil supply means whereby a portion of the liquid flowing from the scrubber to the tank is recirculated through the scrubber in admixture with the fresh oil.

ESMOND J. McKEE.
ROBERT RALSTON RAKESTRAW.